(12) United States Patent
Smith et al.

(10) Patent No.: US 9,822,559 B2
(45) Date of Patent: Nov. 21, 2017

(54) SECURITY DEVICE

(71) Applicant: PLUS 8 INDUSTRIES LIMITED, London (GB)

(72) Inventors: Benjamin Thomas Smith, London (GB); John William Abrahams, London (GB)

(73) Assignee: PLUS 8 INDUSTRIES LIMITED, London (GB)

( * ) Notice: Subject to any disclaimer, the term of this patent is extended or adjusted under 35 U.S.C. 154(b) by 30 days.

(21) Appl. No.: 14/906,950

(22) PCT Filed: Jul. 22, 2014

(86) PCT No.: PCT/GB2014/052239
§ 371 (c)(1),
(2) Date: Jan. 22, 2016

(87) PCT Pub. No.: WO2015/011464
PCT Pub. Date: Jan. 29, 2015

(65) Prior Publication Data
US 2016/0168881 A1 Jun. 16, 2016

(30) Foreign Application Priority Data
Jul. 22, 2013 (GB) .................................. 1313096.8

(51) Int. Cl.
*E05B 67/38* (2006.01)
*E05B 73/00* (2006.01)
*B62J 11/00* (2006.01)
*E05B 67/00* (2006.01)
*E05B 67/06* (2006.01)
*B62H 5/00* (2006.01)

(52) U.S. Cl.
CPC ............... *E05B 73/00* (2013.01); *B62H 5/00* (2013.01); *B62J 11/00* (2013.01); *E05B 67/003* (2013.01); *E05B 67/06* (2013.01)

(58) Field of Classification Search
CPC ........ E05B 67/00; E05B 67/003; E05B 67/02; E05B 67/04; E05B 67/38; E05B 2067/386; E05B 71/00; E05B 73/00; E05B 73/0005; E05B 73/007; E05B 73/0094; E05B 75/005
See application file for complete search history.

(56) References Cited

U.S. PATENT DOCUMENTS 4,736,921 A * 4/1988 Zane .................. B62J 11/00
224/935
5,395,018 A * 3/1995 Studdiford ............... B62J 11/00
224/420

(Continued)

FOREIGN PATENT DOCUMENTS

AU 2003200357 A1 8/2004
DE 102005047496 A1 4/2007
(Continued)

*Primary Examiner* — Christopher Boswell
(74) *Attorney, Agent, or Firm* — Smith IP Services, P.C.

(57) ABSTRACT

A security device can include a clip allowing the security device to be attached to clothing, bags or other accessories without the need for a separate holster or carrier. The security device can be readily transported without the need for a separate holster or carrier.

11 Claims, 13 Drawing Sheets

(56) References Cited

U.S. PATENT DOCUMENTS

| | | | |
|---|---|---|---|
| 5,405,113 A * | 4/1995 | Jaw | B62J 11/00 70/233 |
| 5,704,526 A * | 1/1998 | Kuo | E05B 67/38 224/425 |
| 5,706,679 A * | 1/1998 | Zane | E05B 67/003 70/18 |
| 5,718,134 A * | 2/1998 | Chang | E05B 67/003 70/18 |
| 6,016,673 A * | 1/2000 | McDaid | B62J 11/00 70/233 |
| 6,321,961 B1 * | 11/2001 | McDaid | B62J 11/00 70/233 |
| 6,557,808 B1 | 5/2003 | Ling | |
| 6,619,084 B2 * | 9/2003 | Kuo | E05B 71/00 70/58 |
| 6,684,668 B1 * | 2/2004 | Hsueh Lee | E05B 67/02 70/312 |
| 6,701,757 B1 * | 3/2004 | Vito | B62H 5/00 70/18 |
| 6,971,564 B2 * | 12/2005 | Yang | E05B 67/38 224/425 |
| 8,851,348 B2 * | 10/2014 | Zuraski | E05B 71/00 224/425 |
| 9,115,513 B1 * | 8/2015 | Cayouette | E05B 73/0005 |
| 9,340,997 B2 * | 5/2016 | Zuraski | B62H 5/00 |
| 2013/0248571 A1 * | 9/2013 | Jones | B62H 5/00 224/463 |
| 2014/0021231 A1 * | 1/2014 | Riat | B62J 11/00 224/412 |

FOREIGN PATENT DOCUMENTS

| | | |
|---|---|---|
| DE | 102008026739 A1 | 12/2009 |
| EP | 1074461 A2 | 2/2001 |
| WO | 2012162631 A2 | 11/2012 |
| WO | 2015011464 A1 | 1/2015 |

* cited by examiner

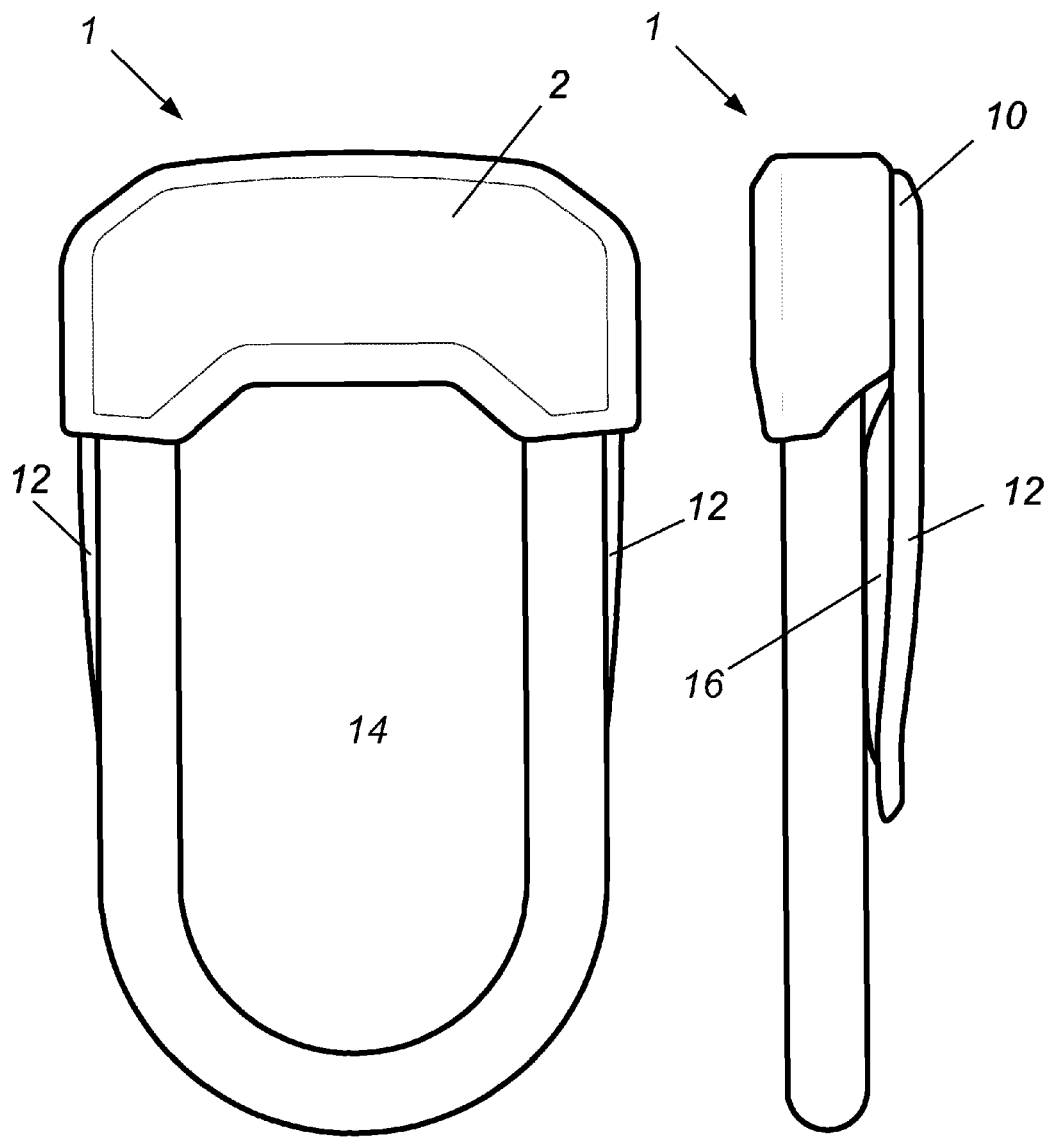

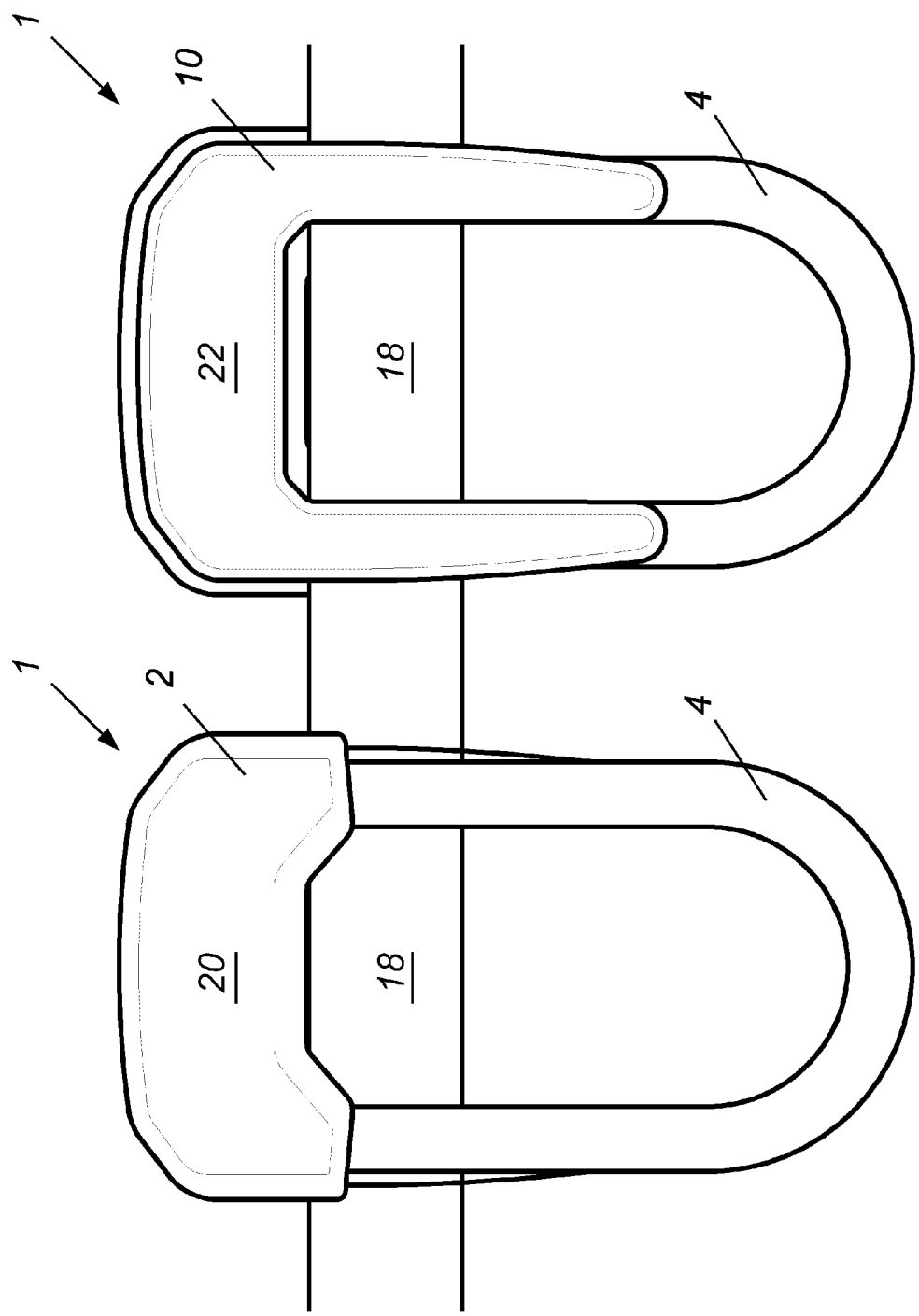

SECURITY DEVICE

CROSS-REFERENCE TO RELATED APPLICATIONS

This application is a national stage under 35 USC 371 of International Application No. PCT/GB2014/052239 filed on 22 Jul. 2014, which claims priority to United Kingdom Application No. 1313096.8 filed 22 Jul. 2013. The entire disclosures of these prior applications are incorporated herein by this reference.

The invention relates to a security device, and the need to transport the aforementioned security device. Particularly, but not exclusively the invention relates to a bicycle lock which can be transported simply and efficiently.

The invention also relates to a retaining device, particularly, but not exclusively, to a cable retainer for retaining a bicycle cable, and a way of transporting simply and efficiently a bicycle cable, and transporting simply and efficiently both the bicycle cable and aforementioned security device.

With the increased congestion in cities, many people are turning to cycling as a quick and healthy means of transport in urban areas. Regrettably, bicycle theft is all too common in such environments, such that the use of a bicycle lock is advisable whenever a bicycle has to be left unattended for any length of time. However, having to carry a lock at all times is inconvenient for cyclists. Some locks are provided with mounting systems for attaching the lock to the frame of the bicycle, but the poor design and build quality of many of these mountings means that the lock can often move around when attached to the bicycle, causing rattles and possibly damage, and the mountings frequently break or fail after relatively little use. The mounting systems are also generally cumbersome and unsightly, so many cyclists prefer not to use them at all.

Often, cyclists will carry other possessions in a bag a bag while cycling and will simply carry a lock in the same bag. However, this can significantly increase the weight of the bag and also reduces the capacity for other articles. In order these problems, or simply to avoid having to carry a bag only for the purpose of transporting a lock, some cyclists will attempt to wrap the lock around, or hang the lock from, the frame or handlebars of the bicycle whilst riding. However, this approach has the same drawbacks as above of creating rattles and potentially damaging the bicycle, and also risks making the bicycle unstable and/or unpredictable in use. There is also the danger that the lock could move around and interfere with the wheels of the bicycle while riding, leading to accidents.

For cyclists such as commuters, who make regular journeys, another solution is to leave a lock in at one or both ends of their journey as required. Often, the lock(s) in question will be of the D-lock (sometimes referred to as U-lock) variety, since these are generally considered to be amongst the most secure locks available, and also are seen as heavy and difficult to transport if the user does not have, or chooses not to use, either a bag or a bicycle attachment. Leaving one or more locks 'in situ' avoids the need to carry a lock on the journey, but can require two separate locks to be purchased. There is also a risk that the lock(s) will be tampered with when unattended. Finally, this solution is of no assistance when the cyclist needs to make a different journey, or to break their journey even for a short time.

Another approach is for cyclists to loop a flexible lock around their neck or waist, or otherwise carry it on their person. This approach was popularised by cycle couriers who started wearing chain locks around the body in this way to provide a practical and speedy way of transporting their lock. However, standard chain locks are not designed to be worn, and can therefore be uncomfortable, difficult, and in some cases even impossible (for example due to their length) to be used in such a way.

Chain locks specifically designed to be worn around the waist are available. Having the weight of the lock around the waist is an ergonomically sound position, as the majority of the weight is translated directly to the hip bones resulting in less strain on the body. The cyclist's centre of gravity is also less affected than if the lock was in a rucksack or bag. However, due to their rigid construction, D-Locks cannot be carried or transported in this way. Some cyclists overcome this problem by carrying a small D-lock in their back pocket. However, even very small D-locks can be too large for many pockets, and often the position of the pocket and the geometry of the bicycle and saddle means that the cyclist ends up sitting on the lock, which is uncomfortable, and/or risks pushing the lock out of their pocket as they sit on the saddle.

There remains, therefore, a desire for an easily transportable lock of the D-Lock variety to allow cyclists who prefer the security of this type of lock the freedom and convenience of taking the lock with them on journeys without having to mount the lock to the bicycle or carry a bag. It is an object of the present invention to provide such a lock.

Often, cyclists will use a cable in combination with a D-lock for extra security when locking their bike. For example, if a D-lock is used to secure one of the wheels to a bicycle rack then this still leaves the remainder of the bike vulnerable to theft. Rather than buy an additional D-lock for the other wheel, cyclists will thread a locking cable through the D-lock and through the other wheel. This minimises further the risk of theft as it is harder and more time-consuming to break through this double lock arrangement. The presence of both locks can also be a significant visual deterrent for thieves.

However, transporting the cable has the same drawbacks as transporting a lock, as described above. Namely, if carried in a bag, the cable will increase the weight of the bag while reducing its capability to carry other articles. If hung from any part of the bike, it could produce rattles and result in the bike being unstable and unpredictable when in use. In some cases, movement of the cable could get caught in the wheels or any part of the cyclist's body resulting in potential dangers. One known alternative is for the cyclist to wear the cable around their body, for example, around their waist or neck. This may also result in parts of the cable getting caught in or interfering with the movement of the bike, however, and due to the weight of the cable, this alternative is also uncomfortable, difficult and highly impractical.

It may also be desirable to use a chain lock in combination with the D-lock, instead of a cable.

Accordingly, there remains a desire for a device for retaining a resilient member, such as a bicycle cable or chain lock, to allow those who prefer the extra security of both a lock and a cable the freedom and convenience of transporting the cable without having to attach the cable to their person, bicycle, or to carry a bag. It is an object of the present invention to provide such a device.

The present invention therefore provides a way for a cyclist to transport both a D-lock and a cable without a significant increase in space from that required to transport a D-lock alone. A further advantage is that the built in clip on the D-lock can be utilised and so the D-lock and cable can be easily and conveniently be secured to a person or another article.

In a first aspect, the invention provides a security device comprising first and second substantially rigid parts, the second part being partially receivable in and lockable to the first part to form a substantially rigid loop defining an enclosed area, wherein clip means for releasably attaching the security device to another article are provided on one of the first and second parts.

Preferably, the first part of the security device comprises the body of a lock, housing a lock mechanism, and the second part comprises a locking shackle.

Advantageously, the locking shackle is substantially 'U' shaped.

Preferably, the clip means is provided on the first part.

Advantageously, the clip means is provided on the second part.

Preferably, no part of the clip means extends into the enclosed area.

Advantageously, the clip means comprises two limbs which align with limbs of the second part when the first and second parts of the security device are secured together.

Preferably, the clip means are located at one end of the security device.

Advantageously, the clip means comprises a resiliently deformable material.

Preferably, the clip means comprises a plastics material.

Advantageously, the first part comprises a reflective portion.

Preferably, the clip means comprises a reflective portion.

In a second aspect, the invention provides a retaining device comprising a body further comprising retaining means for retaining a resilient member; and attachment means for releasably attaching the retaining device to another article.

Preferably, the retaining means is an aperture.

Advantageously, the aperture extends from one side of the body to the other side of the body.

Preferably, the aperture comprises two openings.

Advantageously, the openings are located on either side of the body.

Preferably, a snap fit or interference fit is provided between the attachment means and the other article.

Advantageously, the retaining means has a substantially uniform cross section.

Preferably, the retaining means is substantially rigid.

Advantageously, the retaining device forms an open or closed loop.

Preferably, the open or closed loop is substantially circular-shaped, triangular-shaped or rectangular-shaped.

Advantageously, the retaining means is substantially tubular.

Preferably, all or part of the retaining device comprises a resiliently deformable material.

Advantageously, all or part of the retaining device comprises a plastics material or a rubber material.

Preferably, the attachment means is at least one channel for receiving the other article.

Advantageously, the at least one channel is substantially 'U' shaped.

Preferably, the at least one channel is delimited by the body and an attachment arm, or a pair of attachment arms.

Advantageously, the attachment means extend from opposite ends of the retaining device.

Preferably, the attachment means is at least one closed loop for receiving the other article.

Advantageously, the closed loop is a substantially 'O' shaped ring.

Preferably, the retaining device further comprises a reflective strip and/or a light.

Advantageously, the resilient member is a cable, chord or chain.

Preferably, all or part of the retaining device is fluorescent.

Advantageously, the other article is the security device as claimed in claim 1.

Preferably, all or part of the retaining device occupies the enclosed area of the security device as claimed in claim 1.

Advantageously, the retaining means of the retaining device occupies the enclosed area of the security device as claimed in claim 1.

Preferably, a snap fit is provided between the or each 'U' shaped channel and a section of the security device as claimed in claim 1.

Advantageously, the retaining means, resilient member, attachment means and the shackle lie substantially in the same plane.

Preferably, the other article is a security device comprising first and second substantially rigid parts, the second part being partially receivable in and lockable to the first part to form a substantially rigid loop defining an enclosed area, wherein clip means for releasably attaching the security device to another article are provided on one of the first and second parts.

Advantageously, all or part of the retaining device occupies the enclosed area of the security device.

Preferably, the retaining means of the retaining device occupies the enclosed area of the security device.

Advantageously, a snap fit is provided between the or each 'U' shaped channel and a section of the security device.

Preferably, the retaining means, resilient member, attachment means and the shackle lie substantially in the same plane.

The security device of the present invention provides a rigid D-lock with a built in clip so that the lock can be easily attached to an item of clothing such as a belt, or a bag strap or similar, for easy transportation.

Holsters and belt loops for transporting D-locks are known, but suffer from the drawback that they must general be fitted to a belt in order to hold the D-lock. This means that the D-lock may only be readily carried when that particular belt is being worn. When a different belt is to be worn, the cyclist must detach the holster from the belt on which it is fitted and thread it onto whichever belt they intend to wear. By providing clip means permanently attached to a part of the lock, this problem is immediately overcome. The lock can be carried whether or not a particular belt, or any belt, is being worn. The inclusion of clip means on the lock thus allows far greater freedom of use than the known holsters.

Carrying a lock in a belt holster, or in a back pocket, also significantly limits the maximum size of a lock that can be transported. By providing more options for the carrying position, the invention also overcomes this drawback.

The first part of the security device may comprise the body of the lock, housing the lock mechanism, and the second part may comprise the, preferably substantially 'U' shaped, locking shackle. The size of the first and second parts determines the size of an enclosed defined when the first and second parts are locked together. The size of this enclosed area, in turn, limits the size and/or spacing of one or more articles around which the first and second parts can be locked.

The clip means may be provided on either the first or second part of the security device and preferably follows the outline of the security device so as not to extend into, and thereby reduce the size of, the enclosed area defined by the first and second parts. For example, the clip means may be provided on the first part of the security device and have two limbs extending along two limbs of the generally 'U' shaped second part when the first and second parts are secured together. Alternatively, the clip means could be provided on the second part and simply follow the outline of the second part.

For stability and security, it is preferable if the clip means is provided at one end of the security device (i.e. either on the body of the lock or on the end of the shackle that is, in use, farthest from the body) so that the majority of the weight of the security device is below the engagement between the clip means and the article to which it is attached.

Since security device is designed to be worn, it is preferable to provide reflective portions, markings or coatings on one or more parts of the device. For example, the clip means and/or the first and/or second parts of the device could be provided with reflective portions or coatings.

The retaining device of the present invention provides a rigid body with an aperture so that a bicycle cable may be inserted and retained in the aperture, allowing the cyclist to transport the cable by using the retaining device. This can be accomplished by winding the cable into a coil-like configuration, or any configuration that distorts the cable into a form suitable for insertion into the aperture.

The retaining device comprises attachment means in the form of two 'U' shaped channels shaped to receive the shackle of a D-lock. This enables the retaining means to be releasably secured to the D-lock by a snap fit, and friction between the channels and the other article will prevent the retaining device from slipping. The clip means of the D-lock allows both articles to be secured to a person or another article for transporting. In particular, a cable may be stored in the retaining device, which may then be attached to the D-lock and in this way both the cable and the D-lock may be convenient stored or transported. An advantage of this configuration is that both locks may be secured to a person utilising only the clips of the D-lock.

Additionally, when attached to the D-lock, the cable and retaining means of the retaining device may occupy the enclosed area of the D-lock so that both locks can be transported without requiring substantially more space than that for transporting the D-lock alone.

A better understanding of the present invention will be obtained from the following detailed description of a preferred embodiment. The description is given by way of example only and makes reference to the accompanying drawings in which:

FIG. 2 is a front view of the D-lock of FIG. 1 in a locked configuration;

FIG. 3 is a side view of the D-lock of FIG. 1 in a locked configuration;

FIGS. 5 and 6 show alternative ways of securing the D-lock of FIG. 1 to a strap or belt;

The orientations top, side, above, below etc. are taken from an arbitrary datum and are intended solely to simplify the description below.

Figure 1:
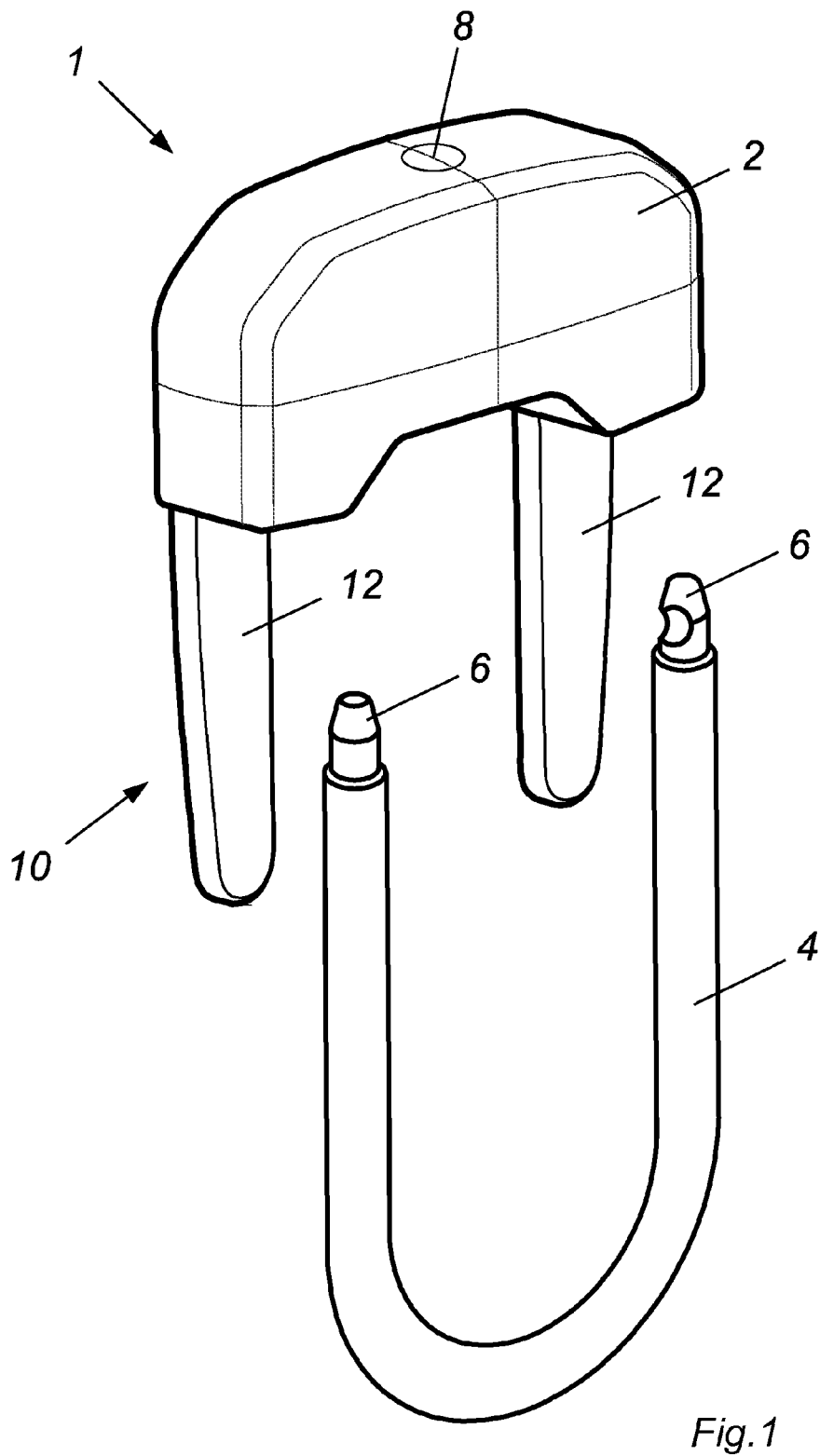
FIG. 1 is a perspective view of a D-lock according to the present invention in an open configuration.

A D-lock 1 according to the present invention is shown in FIG. 1. As is typical, the D-lock 1 comprises two parts, a first part 2 forming the body of the lock and housing the lock mechanism, and a second generally 'U' shaped shackle part 4, the ends of which 6 are received in and locked to the body 2 when the lock 1 is closed. A lock barrel 8 is representatively illustrated in the centre of the body part 2. It is envisaged that the D-lock 1 will incorporate a disc style lock barrel, but alternative locking means such as a blade style lock barrel or combination lock could equally be used.

In accordance with the invention, clip means 10 are provided on the body 2 of the D-lock 1 of FIG. 1. The clip means 10 are formed from a resilient plastics material and comprise a pair of clip limbs 12 extending downwards from the rear of the body 2 as shown in FIG. 1. The clip limbs 12 allow the D-lock 1 to be secured to another article as will be described later.

FIG. 2 shows a front view of the D-lock 1 in a locked configuration. The ends 6 of the shackle 4 have been received in the body 2 such that the body 2 and the shackle 4 together define a closed loop which encloses an area 14. In use, the D-lock 1 will be locked around the frame and/or wheel of a bicycle and ideally also around some immovable anchoring point to secure the bicycle. The 'reach' of the D-lock (the maximum spacing between the outside edges of articles to be surrounded and secured by the lock) clearly cannot exceed the dimensions of the area 14 defined within the lock body 2 and shackle 4. There is, therefore, always a compromise to be made between the ideal large size of this area 14 and the associated size and weight of a lock. In order to maximise the usefulness/versatility of a D-lock of any given size, it is important to ensure that the size of the area 14 is not artificially reduced in any way.

It can be clearly seen from FIG. 2 that the clip limbs 12 of the clip means 10 are aligned with (indeed, largely obscured by) parts of the shackle 4 and, significantly, do not protrude into the enclosed area 14. The clip means 10 therefore has no negative impact on the useful area 14 and maximum 'reach' of the D-lock 1. It should also be noted that the clip limbs 12 extend only slightly beyond the outside edges of the shackle 4 so that the front profile of the D-lock 1 is not noticeably increased by the inclusion of the clip means 10.

By providing the clip means 10 on the lock body 2, longer or shorter shackles 4 can easily be provided to give the option of a larger or smaller D-lock 1 as required while still maintaining the benefits of the invention.

A side view of the same D-Lock 1 is shown in FIG. 3. The clip means 10 is shown on the back of the lock body 2 (the right as shown in FIG. 3) with one of the clip limbs 12 visible alongside the shackle 4. A ridge 16, which protrudes from the clip limb 12, can be seen in contact with the shackle 4. The resilience of the clip means 10 allows a strap, belt, or other relatively thin article to be received between the clip limbs 12 and the shackle 4, and the ridges 4 help to provide resistance to movement of the D-lock 1 to secure it in position.

Figure 4:
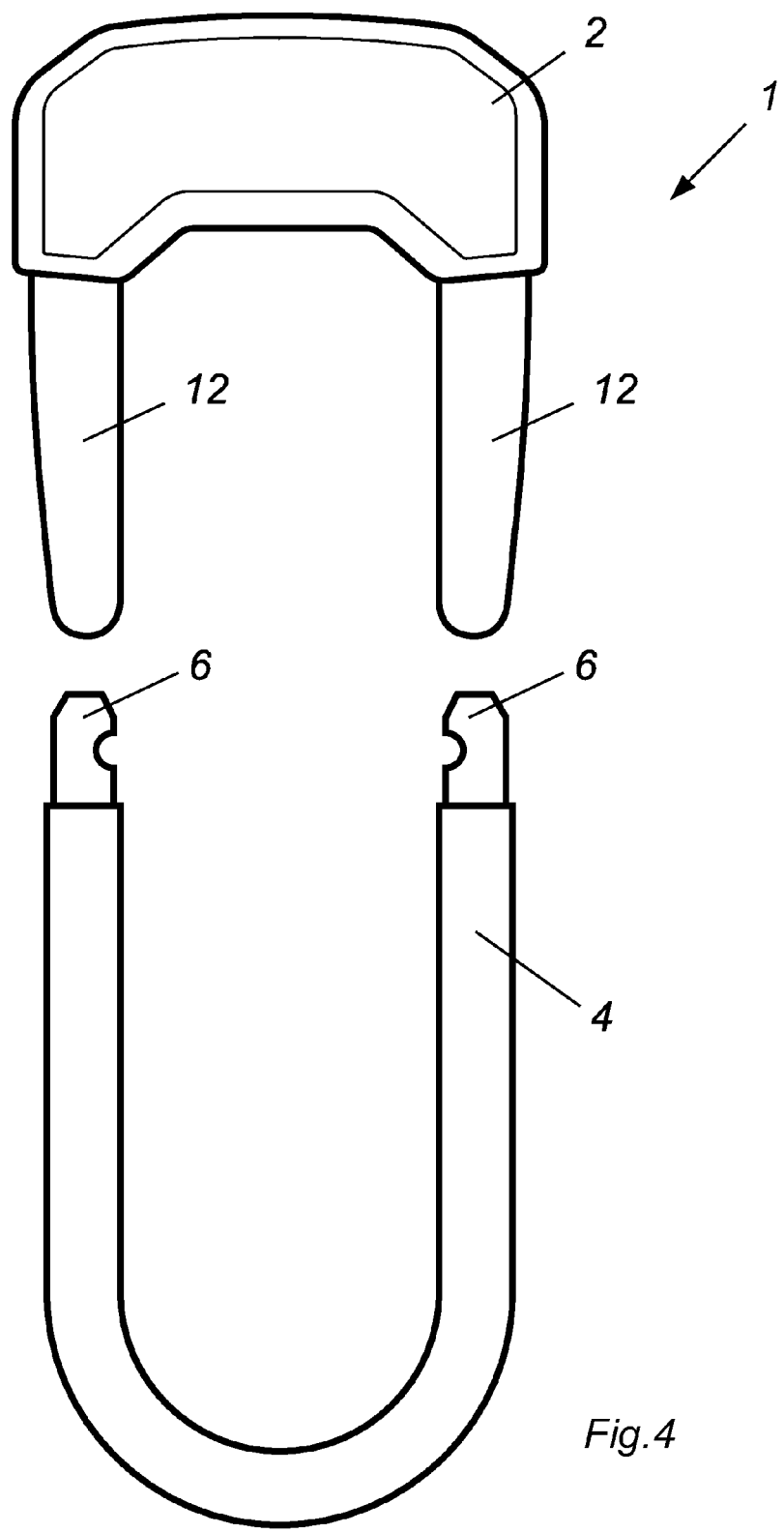
FIG. 4 is a front view of the D-lock of FIG. 1 in an open.

FIG. 4 shows the D-Lock 1 in an open configuration with the body 2 and shackle 4 separated. It can be seen from FIG. 4 that the clip limbs 12 are aligned with the ends of the shackle 4 when the lock is open. This can provide a useful locating and aligning tool when the D-lock 1 is being used to secure a bicycle. Often with D-locks it is necessary to thread the shackle though parts of a bicycle and around an anchoring point before guiding the body 2 onto the ends 6 of the shackle 4. In tight or awkward spaces, it would sometimes be preferable to position the lock body 2 as required and then insert the shackle 4, but this approach can make it difficult to aligning the two parts. The inclusion of the clip limbs 12 on the lock body 2 of the illustrated embodiment simplifies this alignment, making use of the lock in awkward or confined spaces more straightforward.

In FIGS. 5 and 6 the D-lock 1 is shown attached to a simple strap 18, which may be representative of a belt. The clip means 10 may be used to releasably attach the D-lock 1 to any number of articles including, but not limited to, a belt, the waistband of shorts/trousers/skirts, a pocket, a bag strap, the flap of a jacket etc. The invention therefore provides a variety of options for carrying the lock which would not otherwise be available. Even if a cyclist should still choose to ride with the D-lock 1 in a back pocket, the clip means 10 provides greater stability and added resistance to prevent the D-lock being forced or shaken out of the pocket while riding.

FIG. 5 shows the D-lock 1 attached to the strap 18 with the lock facing outwards. This arrangement provides the simplest and quickest attachment and release of the D-lock 1, but is less secure than the arrangement shown in FIG. 6 where the clip means 10 faces outwards and the D-lock 1 is positioned between the strap/belt 18 and the body of a user or some other article.

In both FIGS. 5 and 6 it should be clear that the provision of the clip means 10 on the lock body 2, which forms one end of the complete D-lock 1, means that the majority of the shackle 4 is located below the interface between the clip limbs 12 and the strap/belt such that most of the weight of the D-lock 1 is below the strap when the lock is clipped in place. This helps with stability of the lock when it is being carried.

Reflective surfaces may be provided on the D-lock 1 so that, when worn at night, an additional safety benefit is provided. For example, reflective portions, markings or coatings could be provided on area 20 on the front of the lock body 2, as shown in FIG. 5, or on the outer surface 22 of the clip means 10, as shown in FIG. 6. Alternatively, or additionally, the shackle 4 could be provided with reflective markings or a reflective coating.

Figure 7:
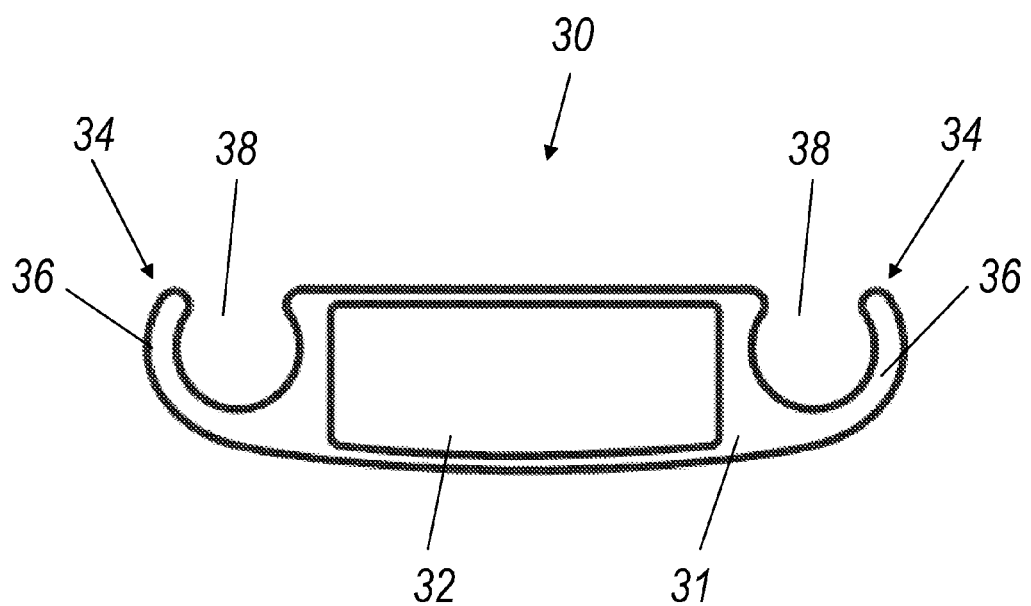
FIG. 7 is a top view of a retaining device according to the present invention.

FIG. 7 shows a top view of a retaining device 30 according to the present invention. The retaining device 30 comprises a body 31 and retaining means 32 for receiving and retaining a cable (not shown). The retaining means 32 has a geometry large enough to accommodate at least part of a cable, but not so large so that the cable will have no or little contact with the retaining means.

In the embodiment of FIG. 7, the retaining means 32 is an aperture (a cavity or hole in the retaining device) for retaining a cable as will be described later. The aperture may be substantially tubular, open at both ends, and extend the length of the retaining device forming a 'tunnel-like' opening. In a further alternative, the aperture may be closed at one end forming a cavity for receiving the cable. The aperture may have a substantially uniform cross section, however, the retaining means 32 may have a non-uniform cross section in keeping with the principles of the present disclosure.

The retaining device 30 is formed from a resilient plastics material, although other materials with additional properties may be selected. For example, it may be preferable for the device to be substantially rigid or pliable. Additionally, the retaining device 30 may be a composite material as it may be desirable, for example, to have the attachment means and the body may be composed from materials with different properties.

It is envisaged that when the cable is placed in the aperture, the friction between the parts of the cable abutting the inside walls of the aperture prevent the cable from slipping out when the retaining device 30 is carried. If the aperture is closed at both ends then the "bottom" of the aperture will prevent the cable from falling out. This may be preferred if articles other than a cable are desired to be retained in the device 30.

It may be desirable for all or part of the retaining device 30 to be formed of a material with a high friction coefficient. For example, the retaining device 30 may contain a rubber part, or comprise a plastics coating. Alternatively, the aperture may be lined with a material with a high friction coefficient to aid in frictionally retaining and gripping the cable. In other embodiments the attachment means may be lined with a material with a high friction coefficient to aid in frictionally retaining and gripping the other article.

Figure 8:
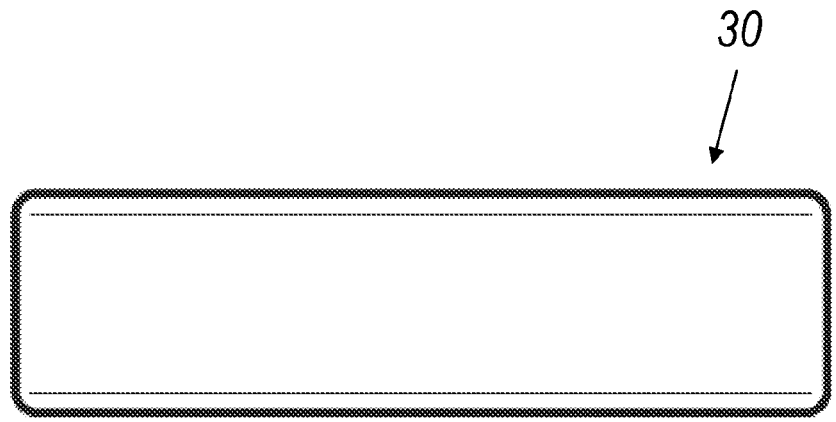
FIG. 8 is a back view of the retaining device of FIG. 7.
Figure 9:
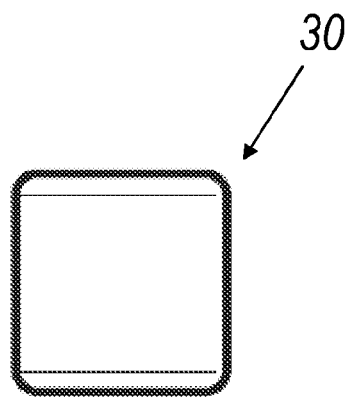
FIG. 9 is a side view of the retaining device of FIG. 7.

FIGS. 8 and 9 shows back and side views, respectively, of the retaining device 30. As shown in FIGS. 8 and 9, the retaining device has substantially uniform width, length and depth, although alternative ratios may be preferred.

Referring again to FIG. 7, a pair of attachment means 34 are provided on opposing sides of the retaining device 30. The attachment means 34 are in the form of a 'U' shaped channel defined by the body 31 and an attachment arm 36 that allows the retaining device 30 to be attached to another article as will be described later. Although a pair of attachment means is shown in the embodiment of FIG. 7, it is to be understood that any number of attachment means may be provided. Additionally, any type of attachment means 34 may be provided for securing the retaining device 30 to another article. For example, a pair of attachment arms 35 defining 'U' shaped channel therebetween may extend from the body 31 of the device 30. Although the attachment means 34 are provided at opposing ends of the device 30, any number of attachment means 34 may be located at any part of the device 30 in keeping with the principles of the present disclosure. Alternatively, attachment means in the form of locking means may be equally suitable. For example, one or more locking pins/shackles may be provided to be received in an opening in another article, thereby releasably securing the retaining device to the other article.

When a cable is to be transported it may be placed in the retaining means. The aperture is open at both ends comprising a first opening in a first end, and a second opening in a second end, defining a "tunnel" therebetween for a cable to be retained therein.

Figure 10:
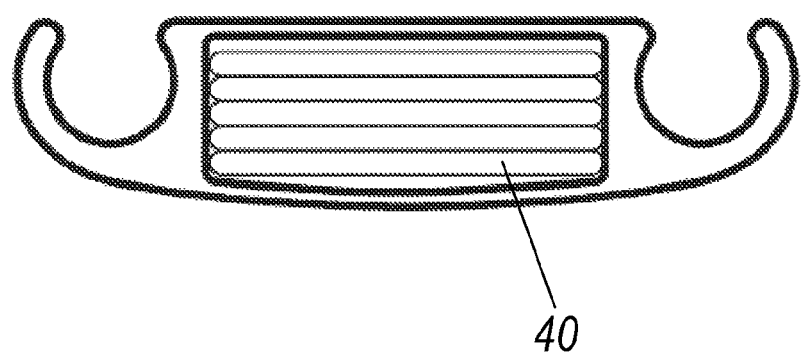
FIG. 10 is a top view of the retaining device of FIG. 7 retaining a cable.
Figure 12:
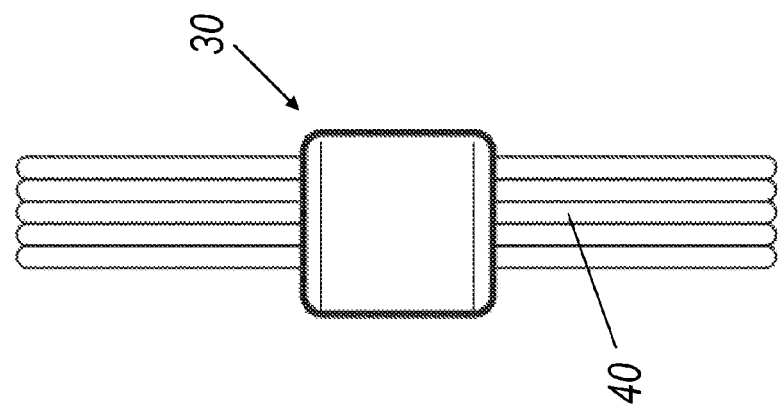
FIG. 12 is a side view of the retaining device of FIG. 7 retaining a cable.
Figure 11:
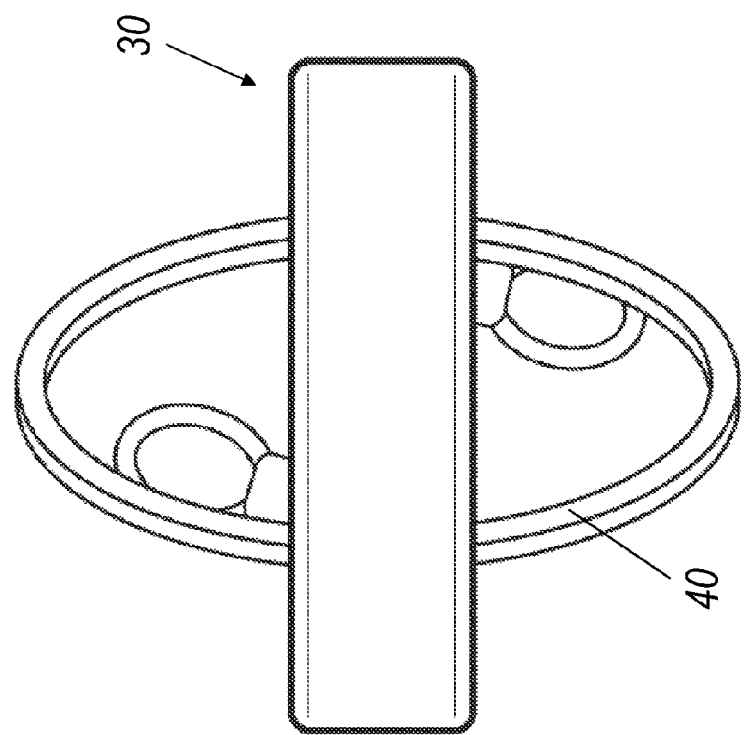
FIG. 11 is a back view of the retaining device of FIG. 7 retaining a cable.
Figure 13:
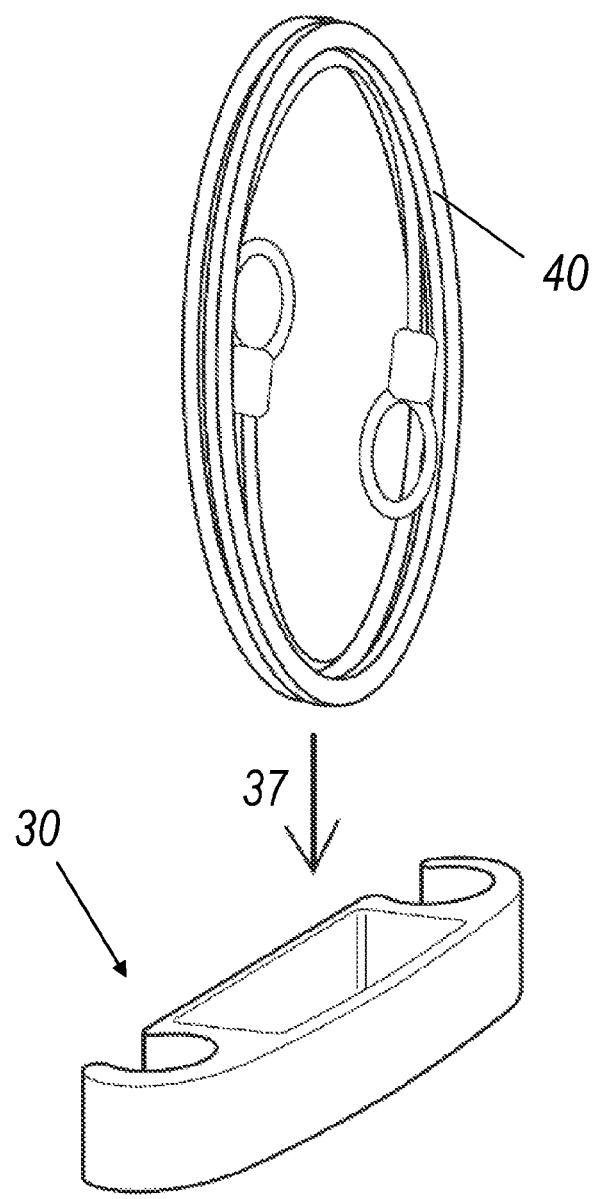
FIG. 13 is a perspective view of a cable being inserted into the retaining device of FIG. 7.

FIGS. 10, 11 and 12 show front, rear and side views, respectively, of the security device 30 retaining a cable 40. The cable 40 may be wound or bent into a substantially circular coil and then placed in the aperture, as is shown in FIGS. 10-12. FIG. 13 shows the wound cable 40 ready to be placed in the retaining device 30. The cable 40 may be moved as indicated by arrow 37 into the retaining device 30. The cable may be wound in any configuration before being placed in the retaining device 30. For example, the cable may also be threaded in a first direction through the first opening and out through the second opening. It may then be looped back on itself and threaded in a second direction, opposite to the first, through the second opening and out again through the first opening. This may be repeated, looping the cable back and forth on itself so that a substantial volume of the aperture is occupied by the cable.

As a further alternative, any number of retaining devices may be used to retain a cable in keeping with the principles of the present disclosure. For example, it may be preferable to thread the cable through the aperture of a first retaining device and through the aperture of a second retaining device. Then, looping back on itself, through the second and back through the first etc. . . . .

When the retaining device 30 is to be transported (with or without retaining a cable) it may be attached to another article via the attachment means 34.

As shown in FIGS. 7, 10 and 13 the attachment means 34 are in the form of a pair of 'U' shaped channels defined by the body 31 and attachment arms 36. It is envisaged that the diameter of the 'U' shaped channel 38 is equal to or slightly less than the width of the article to be received and hence the article will be retained in the attachment means 32 by friction and or by a snap fit. However, alternative attachment mechanisms may be used in keeping with the principles of the present disclosure. For example, it may be preferred to provide clip means for attachment to another article. It is envisaged that frictional contact between the attachment means and the other article prevents the retaining device 30 from slipping.

In a further alternative, the attachment means may be in the form of a closed, substantially 'O' shaped, ring through which the other article may be slid and retained.

Figure 14:
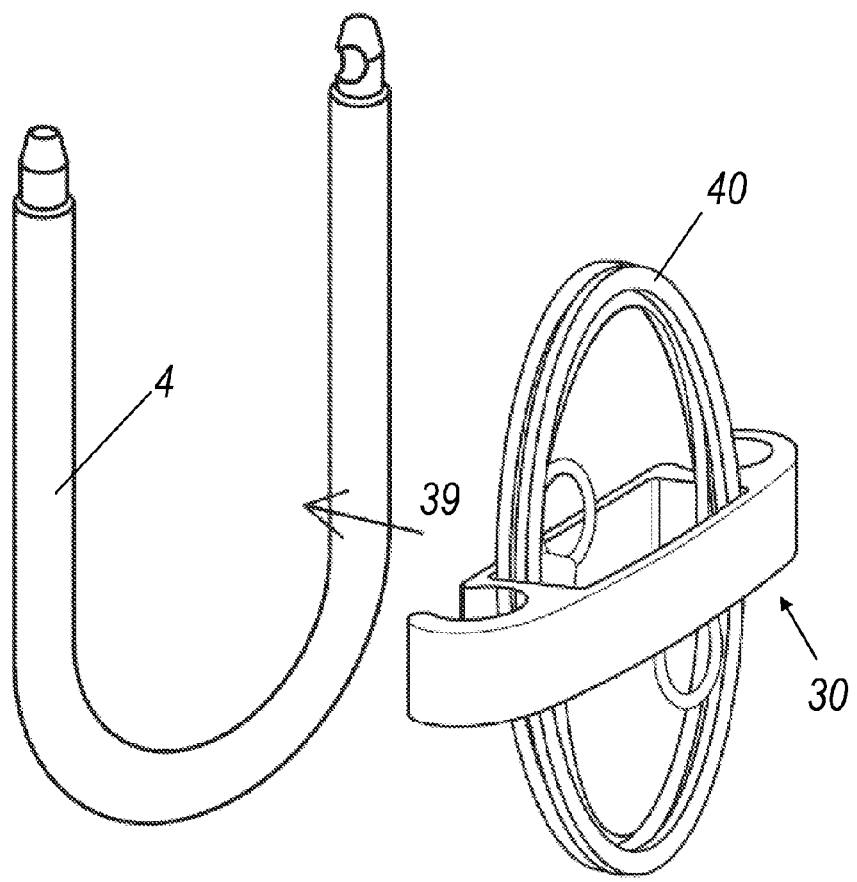
FIGS. 14 and 15 is a perspective view of the retaining device of FIG. 7, while retaining a cable, being secured to the D-lock of FIG. 1.
Figure 15:
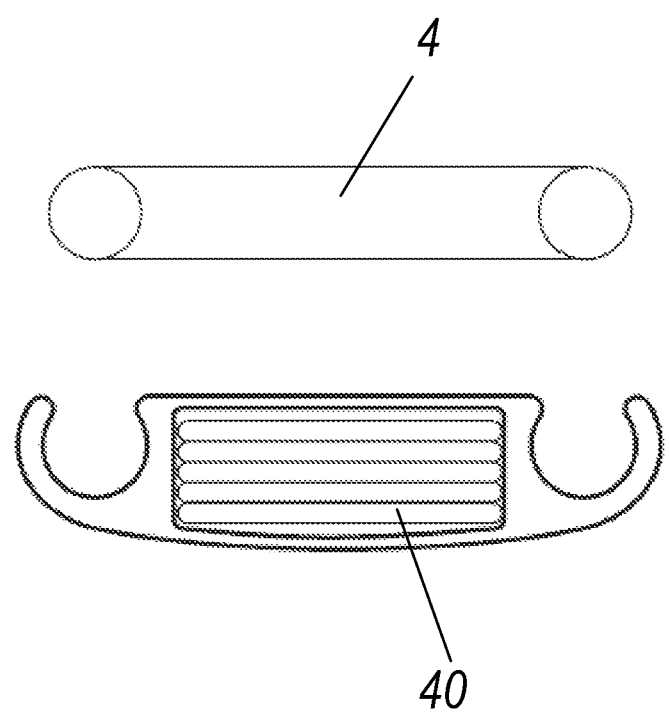

Referring additionally now to FIGS. 14 and 15, it is envisaged that the retaining device 30 may be secured to the D-lock 1 as described above via the attachment means. The retaining device 30 is moved as indicated by arrow 39 into engagement with the D-lock 1 with reference to FIG. 14. The 'U' shaped channels defined by the attachment arms 36 and the body 31 will receive part of the 'U' shaped shackle part 4 of the D-lock 1. The width of the retaining device 30 is substantially identical to the width of the D-lock 1 and so the attachment means 32 on opposing sides of the retaining device 30 may be secured to opposing sides of the 'U' shaped shackle part 4. Specifically, opposing sides of the 'U' shaped shackle part will be received in the 'U' shaped channels of each pair of attachment arms 36 on opposing sides of the retaining device. It is necessary that the diameter of the 'U' shaped channels 38 are equal to or slightly less than the diameter of the shackle part 4 so as to allow for the attachment means 32 allow for a snap fit to retain the shackle part 4 within the channels 38. FIGS. 14 and 15 illustrate this situation when the retaining device 30 is retaining the cable 40 however the D-lock 1 and retaining device 30 may be secured together in this way in the absence of the cable 40.

Figure 16:
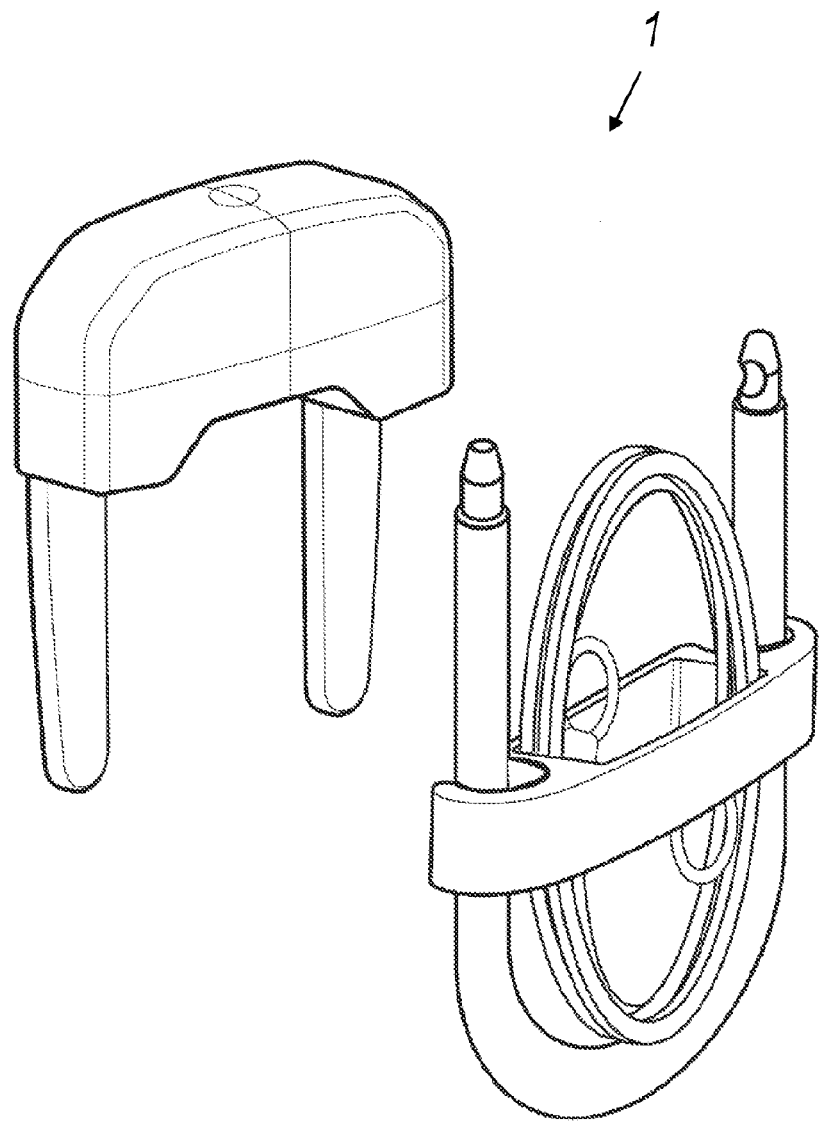
FIG. 16 is a perspective view of the retaining device of FIG. 7 retaining a cable and attached to the D-lock in an open configuration.
Figure 17:
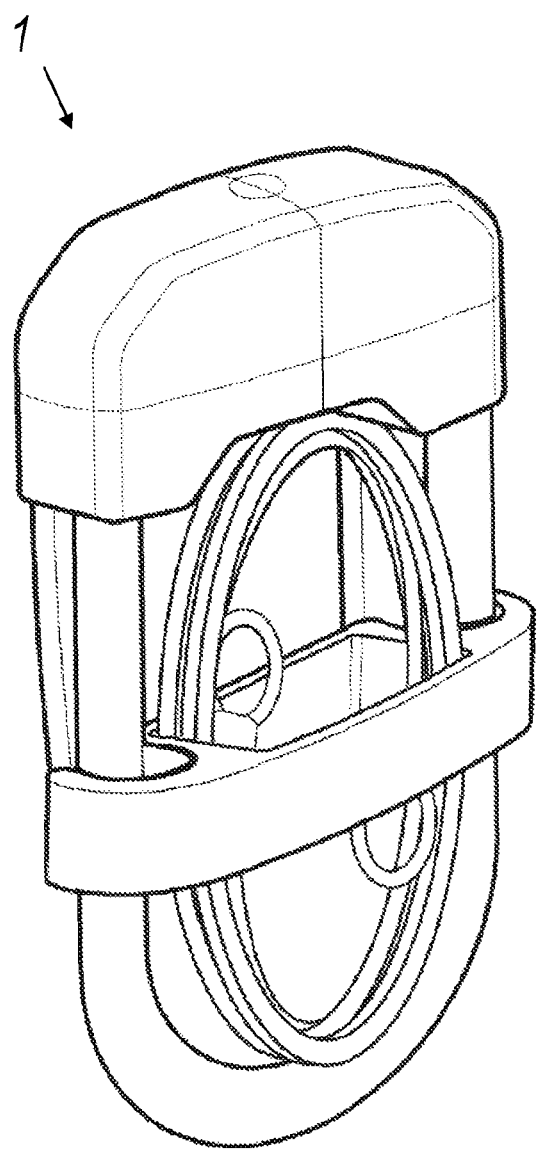
FIG. 17 is a perspective view of the retaining device of FIG. 7 retaining a cable and attached to the D-lock in a closed configuration.

In such an arrangement, the retaining means 32 protrudes into the enclosed area 14 of the D-lock 1 when in a locked configuration. In this way, the volume of the D-lock 1 with the retaining device 30 attached is not substantially larger than the volume of the D-lock 1 alone. FIGS. 16 and 17 show the cable 40 retained in the retaining device 30, which is about to be secured to the shackle 4 of the D-lock via friction and/or by a snap fit. FIG. 16 shows the D-lock in an open configuration while FIG. 17 shows the D-lock in a closed configuration. It is also envisaged that when a cable is stored in the aperture 40, the retaining means 32 and cable 40 protrude into the enclosed area 14 of the D-lock 1. In particular, as shown in FIG. 17, when the cable is retained in the device 30 and the device is attached to the D-lock 1, both the retaining means 32 and the cable protrude into the enclosed area. In this way the otherwise unoccupied enclosed area 14 of the D-lock 1 is utilised. This allows both the cable and the D-lock 1 to be stored and/or transported by the cyclist in a manner that does not significantly increase the space needed to store or transport to the D-lock 1 alone. The combined article (the D-lock 1 with retaining device 30 retaining a cable 40) may then be attached to a person or another article by the clip means 10. Preferably, the retaining device 30 does not extend (or extends only slightly) beyond the outside edges of the shackle 4 so as not to noticeably increase the width of the combined article.

Although it is envisaged that the retaining device 30 may be secured to the shackle part 4 thereby utilising the enclosed area 14 of the D-lock 1, the retaining device 30 may be secured to any part of the D-lock in keeping with the principles of the present disclosure.

If the attachment means 34 are in the form of closed, substantially 'O' shaped, rings then the ends 6 of the shackle 4 of the D-lock 1 may be received therein when the D-lock 1 is in an open configuration, thereby sliding the retaining device 30 down the shackle 4 and onto the D-lock 1. The body 2 of the D-lock 1 may then be locked to the shackle part in the manner described above. In this way the retaining device 30 is secured to the D-lock 1 in a way that prevents the retaining device 30 from being ripped or pulled off with excessive force. It is also envisaged that the retaining device 30 is retained on the D-lock 1 by friction and/or an interference fit. Preferably, the interior diameter of the closed, 'O' shaped rings is equal to or slightly less than the exterior diameter of the shackle 4 of the D-lock 1.

To allow for higher visibility in dark areas or at night, all or part of the retaining device 30, D-lock 1 or both, may be provided with a light or reflective strip or similar.

When the user is ready to ride their bicycle they will first unlock the cable 40 and the D-lock 1. Then the cable 40 may be wound or otherwise manipulated and be placed in the aperture such that the cable 40 is frictionally retained therein. The retaining device 30, now retaining the cable 40, may then be attached to the D-lock 1 via the attachment means 34. Firstly, the shackle 4 of the D-lock 1 is aligned with the retaining device 30 such that the shackle 4 can be received within the 'U' shaped channels of the attachment means 34. The shackle 4 may then be received in the channels of the attachment means 34 by friction and/or a snap fit. The retaining device 30 and cable 40 are now attached to the lower portion of the D-lock 1. The ends 6 of the shackle part 4 may then be received in and locked to the body 2 of the D-lock, bringing the D-lock 1 into a locked configuration as described above.

Alternatively, the D-lock 1 may be locked before the retaining device 30 is attached to the shackle 4.

The invention is not considered to be limited to the configurations and materials described above. The configuration of the structure as well as the dimensions and, to a certain extent, the material of the component parts would be dependent on a specific application.

The present invention greatly simplifies the transportation of a security device, in particular a bicycle D-lock, because the provision of integral clip means allows the security device to be attached to clothing, bags or other accessories without the need for a separate holster or carrier.

The present invention greatly simplifies the transportation of a resilient member, in particular a bicycle cable, as the provision of attachment means allows the retaining device to be attached to a D-lock, clothing, bags or other accessories.

A security device can comprise first and second substantially rigid parts, the second part being partially receivable in and lockable to the first part to form a substantially rigid loop defining an enclosed area. Clip means for releasably attaching the security device to another article may be provided on one of the first and second parts. The first part of the security device may comprise the body of a lock, housing a lock mechanism, and the second part may comprise a locking shackle. The locking shackle may be substantially 'U' shaped. The clip means may be provided on the first part and/or on the second part. No part of the clip means may extend into the enclosed area. The clip means may comprise two limbs which align with limbs of the second part when the first and second parts of the security device are secured together. The clip means may be located at one end of the security device. The clip means may comprise a resiliently deformable material. The clip means may comprise a plastics material. The first part may comprise a reflective portion. The clip means may comprise a reflective portion.

A retaining device may comprise a body with retaining means for retaining a resilient member, and attachment means for releasably attaching the retaining device to another article. The retaining means may be an aperture. The aperture may extend from one side of the body to the other side of the body. The aperture may comprise two openings. The openings may be located on either side of the body. A snap fit or interference fit may be provided between the attachment means and the other article. The retaining means may have a substantially uniform cross section. The retaining means may be substantially rigid. The retaining device may form an open or closed loop. The open or closed loop may be substantially circular-shaped, triangular-shaped or rectangular-shaped. The retaining means may be substantially tubular. All or part of the retaining device may comprise a resiliently deformable material. All or part of the retaining device may comprise a plastics material or a rubber material.

The attachment means may be at least one channel for receiving the other article. The at least one channel may be substantially 'U' shaped. The at least one channel may be delimited by the body and an attachment arm, or a pair of attachment arms. The attachment means may extend from opposite ends of the retaining device. The attachment means may be at least one closed loop for receiving the other article. The closed loop may be a substantially 'O' shaped ring. The retaining device may include a reflective strip and/or a light. The resilient member may be a cable, chord or chain. All or part of the retaining device may be fluorescent.

The other article may be a security device comprising first and second substantially rigid parts, the second part being partially receivable in and lockable to the first part to form a substantially rigid loop defining an enclosed area. Clip means for releasably attaching the security device to another article may be provided on one of the first and second parts. All or part of the retaining device may occupy the enclosed area of the security device. The retaining means of the retaining device may occupy the enclosed area of the security device. A snap fit may be provided between the or each 'U' shaped channel and a section of the security device. The retaining means, resilient member, attachment means and the shackle may lie substantially in the same plane.

The other article may be a security device comprising first and second substantially rigid parts, the second part being partially receivable in and lockable to the first part to form a substantially rigid loop defining an enclosed area, with clip means for releasably attaching the security device to another article being provided on one of the first and second parts. All or part of the retaining device may occupy the enclosed area of the security device. The retaining means of the retaining device may occupy the enclosed area of the security device. A snap fit may be provided between the or each 'U' shaped channel and a section of the security device. The retaining means, resilient member, attachment means and the shackle may lie substantially in the same plane.

The invention claimed is:

1. A security device, comprising:
    first and second substantially rigid parts, the second part being lockable to the first part to form a substantially rigid loop defining an enclosed area,
    wherein clip means for releasably attaching the security device to another article are provided on the first part of the security device,
    wherein the clip means extend along the second part of the security device in a locked configuration of the security device, to thereby allow the other article to be received between the clip means and the second part, and
    wherein the clip means comprises an integrally formed portion of the first part.

2. The security device according to claim 1, wherein the first part of the security device comprises a body of a lock, the body housing a lock mechanism, and wherein the second part comprises a locking shackle.

3. The security device according to claim 1, wherein no part of the clip means extends into the enclosed area.

4. The security device according to claim 1, wherein the second part is partially receivable in the first part.

5. A retaining device, comprising:
    a body comprising retaining means for retaining a resilient member; and
    attachment means for releasably attaching the retaining device to a security device, the security device comprising first and second substantially rigid parts, the second part being partially receivable in and lockable to the first part to form a substantially rigid loop defining an enclosed area,
    wherein clip means for releasably attaching the security device to another article are provided on the first part of the security device,
    wherein the clip means extend along the second part of the security device in a locked configuration of the security device, to thereby allow the other article to be received between the clip means and the second part, and
    wherein the clip means comprises first and second limbs, the second part comprises first and second opposite ends, and each of the clip means first and second limbs extends along the second part adjacent a respective one of the first and second opposite ends in the locked configuration of the security device.

6. The retaining device according to claim 5, wherein all or part of the retaining device occupies the enclosed area of the security device.

7. The retaining device according to claim 5, wherein the retaining means of the retaining device occupies the enclosed area of the security device.

8. A security device, comprising:
first and second substantially rigid parts, the second part being lockable to the first part to form a substantially rigid loop defining an enclosed area,
wherein clip means for releasably attaching the security device to another article are provided on the first part of the security device,
wherein the clip means extend along the second part of the security device in a locked configuration of the security device, to thereby allow the other article to be received between the clip means and the second part, and
wherein the clip means comprises first and second limbs, the second part comprises first and second opposite ends, and each of the clip means first and second limbs extends along the second part adjacent a respective one of the first and second opposite ends in the locked configuration of the security device.

9. The security device according to claim 8, wherein the first part of the security device comprises a body of a lock, the body housing a lock mechanism, and wherein the second part comprises a locking shackle.

10. The security device according to claim 8, wherein no part of the clip means extends into the enclosed area.

11. The security device according to claim 8, wherein the second part is partially receivable in the first part.

* * * * *